US008971925B2

(12) United States Patent
Van Erlach

(10) Patent No.: US 8,971,925 B2
(45) Date of Patent: Mar. 3, 2015

(54) METHODS FOR PROVIDING ENHANCED TELECOMMUNICATION SERVICES

(75) Inventor: Julian Van Erlach, Fort Worth, TX (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/584,861

(22) Filed: Aug. 14, 2012

(65) Prior Publication Data

US 2012/0309368 A1    Dec. 6, 2012

Related U.S. Application Data

(60) Continuation of application No. 13/025,200, filed on Feb. 11, 2011, which is a division of application No. 12/795,831, filed on Jun. 8, 2010, now Pat. No. 7,957,725, which is a division of application No. 11/549,156, filed on Oct. 13, 2006, now Pat. No. 7,929,958, which is a division of application No. 10/371,469, filed on Feb. 22, 2003, now Pat. No. 7,127,261.

(51) Int. Cl.
*H04W 24/00* (2009.01)
*G06Q 30/02* (2012.01)
*G06Q 30/06* (2012.01)
*H04W 4/02* (2009.01)
*H04L 29/08* (2006.01)

(52) U.S. Cl.
CPC ........ *G06Q 30/0207* (2013.01); *G06Q 30/0601* (2013.01); *H04W 4/02* (2013.01); *H04W 4/023* (2013.01); *H04L 67/18* (2013.01)
USPC .................. 455/456.2; 455/456.1; 455/414.1; 705/27.1

(58) Field of Classification Search
CPC .. H04W 64/00; H04W 4/02; H04L 29/08108; G01Q 30/0641
USPC ........... 455/456.2, 414.1, 456.1; 705/27, 27.1
See application file for complete search history.

(56) References Cited

U.S. PATENT DOCUMENTS 5,806,045 A    9/1998  Biorge et al.
5,956,636 A    9/1999  Lipsit (Continued)

OTHER PUBLICATIONS

Final Office Action for U.S. Appl. No. 13/025,200, mailed on Sep. 20, 2013, Julian Van Erlach, "Methods for Providing Enhanced Telecommunication Services", 8 pages.

(Continued)

*Primary Examiner* — Danh Le
(74) *Attorney, Agent, or Firm* — Lee & Hayes, PLLC

(57) ABSTRACT

A method for processing a product identifying code. The product identifying code that identifies a product is received from a wireless device. A location of the wireless device is received. An item that comprises information pertaining to the product is obtained. The obtained item is transmitted to the wireless device. The information pertaining to the product includes a name of each establishment of a plurality of establishments from which the product is available and informational selected from the group consisting of a contact address for each establishment, driving instructions to each establishment, a price of the product at each establishment, a geocoded location of one establishment of the plurality of establishments relative to the location of the wireless device, descriptive information specific to the product, and combinations thereof.

19 Claims, 6 Drawing Sheets

(56) References Cited

U.S. PATENT DOCUMENTS

| | | |
|---|---|---|
| 6,123,259 A | 9/2000 | Ogasawara |
| 6,587,835 B1 | 7/2003 | Treyz et al. |
| 6,651,053 B1 | 11/2003 | Rothschild |
| 6,676,017 B1 | 1/2004 | Smith, III |
| 6,859,831 B1 | 2/2005 | Gelvin et al. |
| 6,898,434 B2 | 5/2005 | Pradhan et al. |
| 6,922,686 B2 | 7/2005 | Okamoto et al. |
| 6,975,855 B1 | 12/2005 | Wallenius |
| 6,975,873 B1 | 12/2005 | Banks et al. |
| 7,127,261 B2 | 10/2006 | Van Erlach |
| 7,284,191 B2 | 10/2007 | Grefenstette et al. |
| 7,509,271 B2 | 3/2009 | Uchimi et al. |
| 7,929,958 B2 | 4/2011 | Van Erlach |
| 7,957,725 B2 | 6/2011 | Van Erlach |
| 2001/0026609 A1 | 10/2001 | Weinstein et al. |
| 2001/0046657 A1 | 11/2001 | Dorn |
| 2001/0049636 A1* | 12/2001 | Hudda et al. .................. 705/26 |
| 2001/0054180 A1 | 12/2001 | Atkinson |
| 2002/0013852 A1 | 1/2002 | Janik |
| 2002/0024536 A1 | 2/2002 | Kahan et al. |
| 2002/0035609 A1 | 3/2002 | Lessard et al. |
| 2002/0087543 A1 | 7/2002 | Saitou et al. |
| 2002/0088522 A1 | 7/2002 | Uchino et al. |
| 2002/0098832 A1 | 7/2002 | Fleischer et al. |
| 2002/0107027 A1* | 8/2002 | O'Neil .......................... 455/456 |
| 2002/0164977 A1* | 11/2002 | Link, II et al. ................ 455/414 |
| 2002/0183068 A1 | 12/2002 | Dunko et al. |
| 2003/0037104 A1 | 2/2003 | Okamura |
| 2003/0074321 A1 | 4/2003 | Peled |
| 2003/0083076 A1 | 5/2003 | Pradhan et al. |
| 2003/0130857 A1 | 7/2003 | Matsuo |
| 2003/0135493 A1 | 7/2003 | Phelan et al. |
| 2003/0135494 A1 | 7/2003 | Phelan et al. |
| 2003/0135581 A1 | 7/2003 | Phelan et al. |
| 2003/0147518 A1 | 8/2003 | Albal et al. |
| 2003/0154164 A1 | 8/2003 | Mascavage, III et al. |
| 2003/0154480 A1 | 8/2003 | Goldthwaite et al. |
| 2004/0002359 A1* | 1/2004 | Deas et al. ................ 455/556.2 |
| 2004/0002904 A1* | 1/2004 | Deas et al. ...................... 705/27 |
| 2004/0192299 A1 | 9/2004 | Wilson et al. |
| 2004/0203901 A1 | 10/2004 | Wilson et al. |
| 2004/0203902 A1 | 10/2004 | Wilson et al. |
| 2004/0203903 A1 | 10/2004 | Wilson et al. |
| 2004/0204063 A1 | 10/2004 | Van Erlach |
| 2006/0053378 A1* | 3/2006 | Fano et al. .................... 715/747 |
| 2006/0089792 A1 | 4/2006 | Manber et al. |
| 2006/0230058 A1 | 10/2006 | Morris |
| 2007/0155402 A1 | 7/2007 | Van Erlach |
| 2010/0297985 A1 | 11/2010 | Van Erlach |
| 2011/0136477 A1 | 6/2011 | Van Erlach |

OTHER PUBLICATIONS

Office action for U.S. Appl. No. 13/025,200, mailed on Jun. 6, 2013, Van Erlach, "Methods for Providing Enhanced Telecommunication Services ", 10 pages.

Notice of Allowance (Mail Date Apr. 5, 2010) for U.S. Appl. No. 11/549,156, filed Oct. 13, 2006.

Request for Continued Examination (RCE) filed Sep. 8, 2010 for U.S. Appl. No. 11/549,156, filed Oct. 13, 2006.

Requirement for Restriction/Election (Mail Date Oct. 28, 2010) for U.S. Appl. No. 12/795,831, filed Jun. 8, 2010.

Response filed Nov. 23, 2010 to Restriction for U.S. Appl. No. 12/795,831, filed Jun. 8, 2010.

Notice of Allowance (Mail Date Dec. 14, 2010) for U.S. Appl. No. 11/549,156, filed Oct. 13, 2006.

Notice of Allowance (Mail Date Feb. 2, 2011) for U.S. Appl. No. 12/795,831, filed Jun. 8, 2010.

Requirement for Restriction/Election (Mail Date Jul. 14, 2011) for U.S. Appl. No. 13/025,200, filed Feb. 11, 2011.

Response filed Aug. 9, 2011 to Requirement for Restriction/Election (Mail Date Jul. 14, 2011) for U.S. Appl. No. 13/025,200, filed Feb. 11, 2011.

Office Action (Mail Date Oct. 20, 2011) for U.S. Appl. No. 13/025,200, filed Feb. 11, 2011.

Amendment filed Jan. 5, 2012 in response to Office Action (Mail Date Oct. 20, 2011) for U.S. Appl. No. 13/025,200, filed Feb. 11, 2011.

Notice of Allowance (Mail Date Mar. 16, 2011) for U.S. Appl. No. 13/025,200, filed Feb. 11, 2011.

Request for Continued Examination filed Jun. 12, 2012 for U.S. Appl. No. 13/025,200, filed Feb. 11, 2011.

Requirement for Restriction/Election (Mail Date Dec. 7, 2009) for U.S. Appl. No. 11/549,156, filed Oct. 13, 2006.

Response filed Feb. 8, 2010 to Requirement for Restriction/Election (Mail Date Dec. 7, 2009) for U.S. Appl. No. 11/549,156, filed Oct. 13, 2006.

Notice of Allowance (Mail Date Aug. 1, 2006) for U.S. Appl. No. 10/371,469, filed Feb. 22, 2003.

Office Action for U.S. Appl. No. 13/025,200, mailed on Mar. 7, 2014, Julian Van Erlach, "Methods for Providing Enhanced Telecommunication Services", 9 pages.

* cited by examiner

METHODS FOR PROVIDING ENHANCED TELECOMMUNICATION SERVICES

RELATED APPLICATIONS

This application is a continuation application claiming priority to Ser. No. 13/025,200, filed Feb. 11, 2011; which is a divisional application claiming priority to Ser. No. 12/795,831, filed Jun. 8, 2010, which is now U.S. Pat. No. 7,957,725; which is a divisional of Ser. No. 11/549,156, filed Oct. 13, 2006, which is now U.S. Pat. No. 7,929,958; which is a divisional of Ser. No. 10/371,469; filed Feb. 22, 2003, which is now U.S. Pat. No. 7,127,261.

BACKGROUND OF THE INVENTION

1. Technical Field of Invention

The invention relates generally to telecommunications services and the growing functional capability of portable, digital, wireless communication devices; and specifically to offering enhanced telecommunication services involving wireless communication devices and service providers equipped with enhanced technological functions.

2. Description of Prior and Current Art

Wireless service providers and device makers are constantly seeking to create value-added services capable of generating new revenue. Services are in part determined by software and hardware technological capability. The gradual integration into wireless devices of multiple technologies including computing, broadband, still and moving digital image capture, wireless data capture from digital instruments, short-range local networking such as WiFi and Bluetooth, and others enable new classes of services. Currently, such technologies, if utilized at all, are utilized as discrete functions and not integrated services.

Currently, short-message-systems (SMS) are offered by wireless service providers, as are downloadable ring tones, music or video samples, and forwarding of digital image files taken with digital cameras integrated with wireless devices.

There is a need for methods, systems, and apparatus that provide enhanced telecommunication services.

SUMMARY OF THE INVENTION

The present invention discloses a plurality of unique services and business methods that combine emerging and yet-to emerge technologies in the creation and delivery of value-added services.

The present invention provides a method for facilitating personal contacts among a plurality of subscribers to a location-based person contact service provided by a service provider having a database that comprises a personal profile of each subscriber and filter criteria specified by each subscriber for accepting the personal profiles of the other subscribers, said method comprising:

receiving, by the service provider, a first message from a first wireless device possessed by a first subscriber of the plurality of subscribers, wherein the first message includes data from which a region may be determined by the service provider, and wherein the message further includes a request for the first wireless device to receive those personal profiles of all subscribers whose wireless devices are determined to be within the region who satisfy the filter criteria specified by the first subscriber;

extracting from the database, by the service provider, said those personal profiles; and transmitting, by the service provider to the first wireless device after said receiving the first message, said those personal profiles.

The present invention provides a method for processing a product identifying code that identifies a product, said method comprising:

receiving, by a provider from a wireless device, the product identifying code and a message, said message comprising a request for an item selected from the group consisting of a sample of the product and information pertaining to the product, a database of the provider having items and codes stored therein such that the stored codes are cross-referenced to the stored items, said stored items comprising the requested item;

matching, by the provider, the received product identifying code against the stored codes in the database to determine a matched code from the stored codes;

extracting by the provider, the requested item from the database by cross-referencing the matched code to the requested item; and transmitting, by the provider to the wireless device, the requested item that was extracted from the database.

The present invention provides a method for communicating information to a user of a wireless device by a customer relationship management (CRM) server, comprising:

receiving data from the wireless device being carried by the user in an establishment, said data identifying the wireless device or relating to the user;

cross referencing the received data against a transaction history associated with the device or the user to determine demographic information concerning the user;

generating a message specific to both the establishment and the user, said message being a function of the determined demographic information concerning the user; and transmitting the message to an instrument selected from the group consisting of the wireless device and smart display proximal to the user in the establishment, wherein said receiving, said cross referencing, said generating, and said transmitting are performed by the CRM server.

The present invention provides a method for real-time monitoring of vital signs a living being, comprising:

monitoring in real time, a location and a vital sign parameter of the person;

ascertaining from said monitoring that the vital sign parameter has been violated as an exception condition; and after said ascertaining, communicating information to a local communication node, wherein the information comprises the violated vital sign parameter and the time when said monitoring detected the violated vital sign parameter, and wherein said monitoring, said ascertaining, and said communicating are performed by a vital sign monitor attached to or implanted in the person.

The present invention provides methods, systems, and apparatus that provide enhanced telecommunication services.

DETAILED DESCRIPTION OF THE INVENTION

Figure 1:
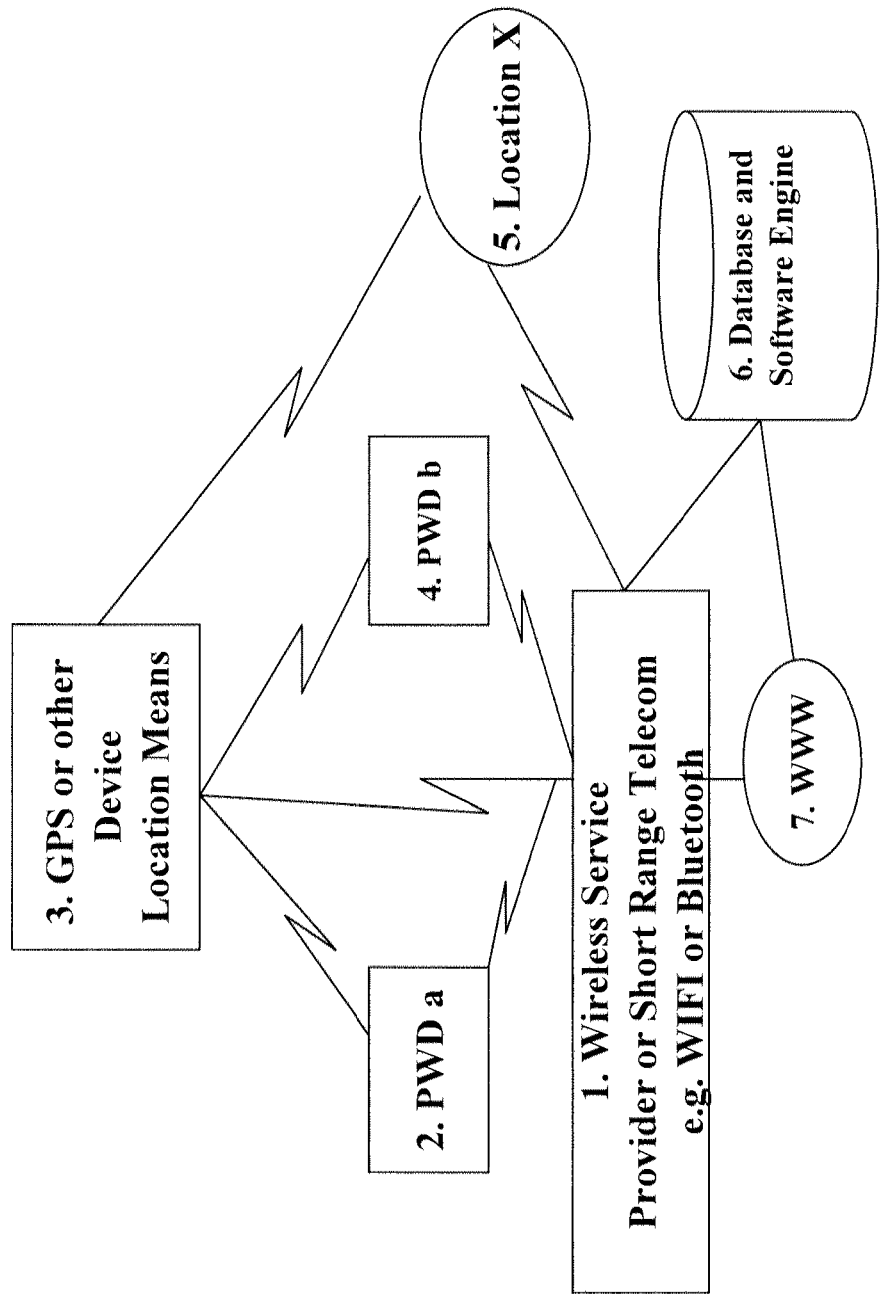
FIG. 1: depicts a platform and network for the operation of a location-based wireless personal introduction method and the various components requisite for operation.

A more complete understanding of the method and apparatus of the present invention may be had by reference to the following detailed description when taken in conjunction with the accompanying drawings wherein the diagrams disclose the functions and systems necessary to provide said methods and services. However, it is understood that this class of embodiments provides only a few examples of the many advantageous uses of the innovative teachings herein. In general, statements made in the specification of the present application do not delimit any of the various claimed inventions.

The invention discloses a plurality of such enhanced services combining enhanced capabilities of portable communication devices and enhanced service provider capabilities. An object of the invention is to create demand for data-intensive wireless content transmission, thus enhancing the economics of enhanced wireless services and adoption of new technologies.

In a first aspect, the Invention discloses the business method of location-based personal introductions and profiles via wireless devices. Enabled by device-integrated global positioning, the invention discloses the business method of enabling users to send and receive personal introductions to one another through a wireless network using their wireless devices, having specified a location or distance from themselves as an operative criteria. The operative means specified by the invention is enabling the user to determine the geographic location of profiles that the user wishes to view, the distance from oneself that the user wishes to send his or her profile, or the distance from oneself that the user wishes to receive or be notified of other subscribers who meet a specifiable criteria set and whose registered devices meet the user's location specification at that time.

In provisional filings 20010026609 Weinstein et al., and 20010046657 Dorn, teach personal wireless introduction methods which in both cases lack a) a method and system to route personal introductions and responses according to user-determinable distance from either the sender or the recipient in addition to personal criteria offered and sought, b) a means to create a multi-media personal ad directly on and through said platform, and c) a database that is dynamically updated for user and subscriber geographic position information used in part to determine the routing of said personal introductions. Dorn teaches a method whereby user platforms only exchange information when in short wireless range of each other, such as the range of Bluetooth transmission.

Today's subscribers increasingly use telecommunication services for business or other valuable conversations, often while using or desiring to use imaging and computing devices and digital instruments. A need is gradually emerging to integrate such data forms into a single telecommunication session digital transcript containing the source of caller ID of each data input, the caller's time of data input, date and location from which the input was made. In a second aspect, the Invention teaches that such a digital transcript permits the creation of a full and complete chronological record of all of the data inputs possible with current technology. This transcript will become a crucial business and interpersonal tool in the near future; affording multi-media documentation of call-session events.

This need is manifest by the multiplicity of devices carried and used by people and the inability to integrate the data created or captured by such devices into a usable digital document directly. Such a need is even more urgent when telecommunication is involved among various parties wherein documentation of such telecommunication is impossible for speech and ad hoc for image and data. No platform exists for integrating these various inputs during a single call session.

In business, science and other fields, people often exchange crucial information over wireless communication networks. When they later need to refer to this information, they must resort to memory, notes and voice recordings in the absence of a comprehensive, integrated call-session transcript. The invention discloses a method to create such a transcript, integrating multi-media components.

In a third aspect, the Invention discloses a method of providing digital product samples or information to subscribers based on a subscriber-definable criteria set. Such criteria may be music, video, book, or game genres that a subscriber wishes to receive samples of new release content in any digital form, including text and multimedia. Samples may be sent as attachments to an email, as links to a web site from which they are streamed, or other means. In a further manifestation, the Invention discloses a method of serving digital product samples or information to a wireless device upon the reading or entry of a product identifying code such as RFID, or barcode by or into an appropriately equipped wireless device. A software program when enabled, accepts the reading or entry of such a product code, transmits the data to a local or remote server as a request for available digital multimedia samples such as music, game or video clips or text. Thereupon, the product code is matched to codes stored in a database and cross-referenced to appropriate samples; and the sample are served to the wireless device originating the request. Such a transaction may occur in a retail store with a shopper reading a barcode of a music compact disk with a wireless device equipped with digital camera and software. Samples of music contained on that compact disk are served to that wireless device. The device user interface may configure to allow the user control of which tracks the user wishes to listen to samples of. Both the sample content and the wireless serving capability may take place locally via a local network and server via short-range RF such as Wi-Fi or Bluetooth, or via traditional wireless network, or a combination of local and broadband to Internet mixed channel network.

In a fourth aspect, the Invention discloses a location-based product price and availability determination means through an appropriately equipped wireless device. Shoppers find it difficult to compare product price and availability for desired products when shopping in a particular commercial establishment. The invention discloses a wireless method, coupled with a capability of a wireless communication device to read a product code and send a query to a service provider to identify availability and prices of said product within a user-defined distance or in a user-specified geographic region. As in aspect three above, a user reads or enters a product code with or into a wireless device and selects a user interface option that allows a price and inventory lookup within a user-defined distance from the geographic position of the device as determined by global positioning systems. A service provider maintains or has access to a database updateable by merchants with both the geocoded location of the merchant and inventory and price data of items identified by common product codes such as bar codes or RFID. The Invention further anticipates a bargaining feature between customers and merchants to close a purchase transaction.

In a fifth aspect, the Invention discloses short-range customer relationship management functions incorporating a means of recognizing and identifying the presence of a specific wireless device and cross referencing that identity to demographic information about the registered owner or user, and transaction data with said owner or user specific to the owner of the establishment and that device owner or user. When that association is made, a local wireless or wireline server can serve messages to the wireless device or drive the content of a local smart sign proximal to the user of the wireless device; perhaps offering personal recognition or special promotions.

Merchants will increasingly deploy smart, computer-driven displays, equipped with wireless transmission capability, visible to shoppers. The invention discloses a means for a smart display and a shopper carrying a smart device equipped with short-range wireless capability, such as Bluetooth, to view or receive targeted content via said smart display or directly to the wireless device. When coupled with identifying information about the device or shopper, matched and retrieved from a database containing a profile and transaction history of a shopper, the smart display can offer highly tailored information and offers to said shopper. Atkinson in provisional filing 20010054180 discloses a system for synchronizing the output of media in public places using interaction among wireless smart devices and smart displays, but does not teach a method wherein the content of a smart display is wholly or partly determined by the steps of matching a user or device identification to a user profile and/or transaction history in a database, and a logic engine that modifies smart display content with respect to said information.

In a sixth aspect, the Invention discloses a means of wireless vital sign and location monitoring enabled to communicate continuously, periodically or on exception conditions to specified telephone or internet addresses as messages through a local wireless network connected to a telecommunications services carrier or the Internet. The invention comprises a wireless vital sign and/or location monitor, such as GPS, a means of wireless communication between the wireless monitor and a digital telephone or computer connected to the Internet and software enabled for programming with telephone numbers and Internet addresses to receive either ongoing messages or messages for exception conditions only. If a vital sign parameter such as body temperature, distance from a specified location, or other parameter is violated, the wireless monitor emits a message to a local digital telephone or computer connected to the Internet. Software directs the transmission of the contents of the exception condition and time as a message to one or more programmed telephone numbers or Internet addresses according to a definable sequence and timing pattern. Said monitor system may also be programmed to transmit routine "all normal" messages. In a further embodiment, said system may be bi-directional with enablement of remote inquiry of conditions monitored by said system and the transmission of said data to the device from which the inquiry originated.

FIG. 1: Wireless Location-Based Personal Contact Service; comprises: 1) wireless service provider which includes traditional cellular carriers as well as short-range (WiFi; Bluetooth) to broadband/Internet networks; personal wireless telecommunication devices (2, 4); (3) a position determination means such as GPS; (5) an exemplary geo-coded location definable by a means recognizable by a geocoding process such as distance radius from a given geographic reference point; (6) a database and software engine; and (7) the World Wide Web or Internet. A subscriber with device (2) has registered with a service provider (1) to engage in personal introductions with appropriate personal profile information and filter criteria for accepting personal profiles from other registrants and having provided his own. Upon entering a mall, the registrant with device (2) queries the service provider (1) for all criteria-meeting individuals with a GPS-determined distance from himself, who will allow their profiles to be viewed and whose registered devices are within that distance. The service provider provides registrant with such profiles including that of registrant with device (4). First registrant decides to contact second registrant and issues instruction to service provider to forward his personal profile to second registrant who has indicated an open to receive personal introductions status. Alternatively, first registrant may query service provider to supply all open to be viewed profiles meeting a definable criteria for a specified region (5), again defined by a means recognizable to a geocoded digital map domain. Service provider has access to a database and software engine (6) or to the Internet (7) from which personal profiles, registration information, device identification, status, and GPS-location information and software necessary to support search and match criteria reside and are updated. Information may flow through a cellular network or through the Internet via broadband channels and through local wireless service such as WiFi or Bluetooth to and from said personal wireless devices. Personal profiles may be previously created and stored on or off a network, or be created directly on a personal wireless device. This may be a paid service. Portions of the provision of personal profiles may be anonymous until either or both parties agree to provide specific personal name and contact information.

Figure 2:
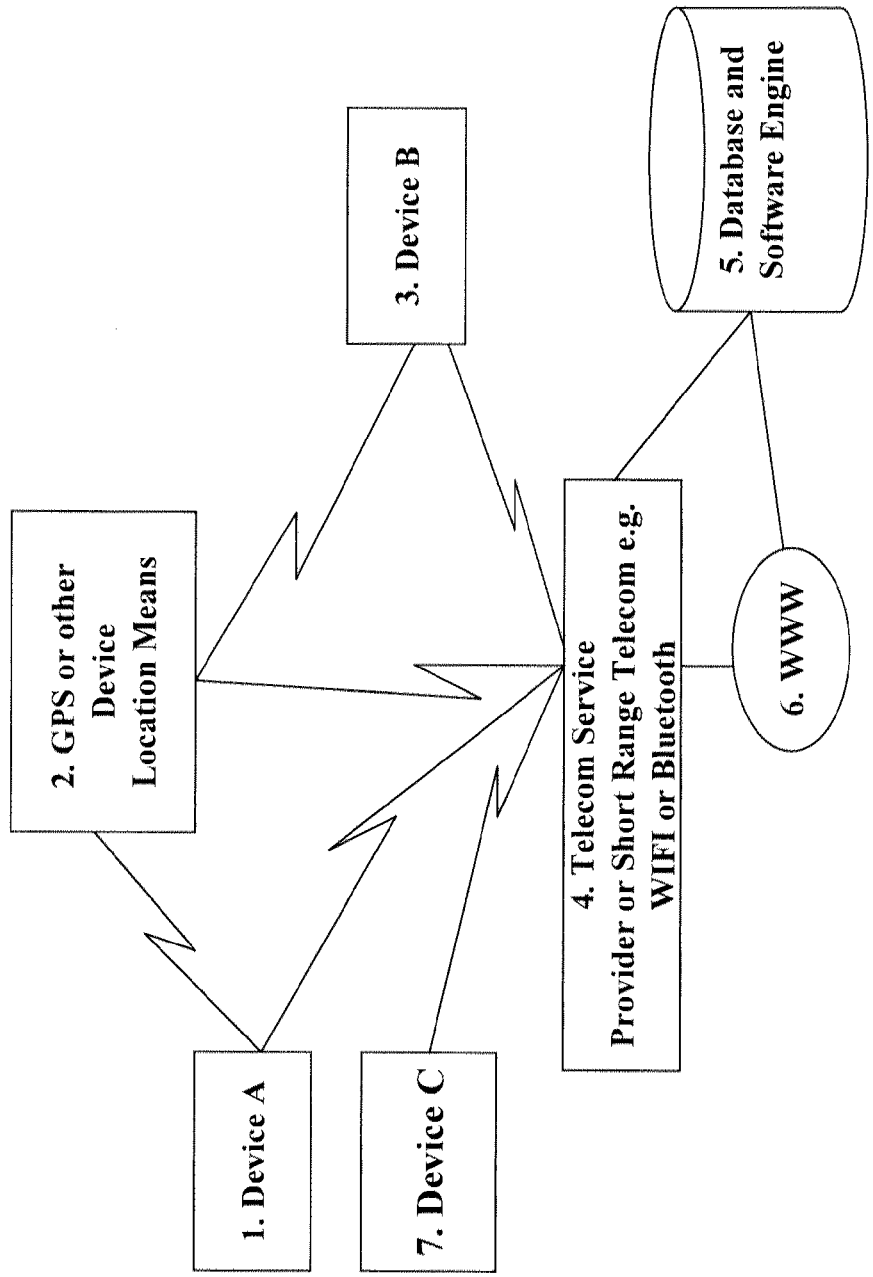
FIG. 2: depicts a platform and network for the creation of digital multimedia documents of a communication among parties through a digital telecommunications network.

FIG. 2: Digital Multimedia Telecommunication Documentation Service; comprises: a global positioning means such as GPS (2); one or more telecommunication devices (1, 3, 7); a telecommunication service provider (4) with access to a database and software engine (5) capable of storing, collating, serving and other functions related to digital documents; and the World Wide Web (6). Speech, text, sound, image and data input from telecommunication devices are merged into a referencable digital document either in the telecommunication devices or by the service provider as they are streamed from said devices. Thus a user of device A (1) while interacting with the user of device B (3) may be speaking, taking video images and transmitting data read into his wireless device via short-range RF (e.g. Bluetooth, WiFi) from a digital instrument. Rather than being merely discrete digital files, these elements are integrated into a digital document incorporating speech-to-text, image, sound, and data complete with references to the source device ID, time sequence and location. At any time, this digital document may be emailed to specified addresses, referenced remotely from a server, manipulated or integrated into other documents. The composition of the document includes speech-to-text converted material, digital images, digitized sound, digital data and representation of other data, such as physical forces, in digital form. Time and geographic location indication may be provided as well as the device serving as the source for any item of data at the time it was provided. At any time during or after a telecommunication session, any authorized party may access the digital document of that session from any device connected to an appropriate network, such as (7) device C that may be a personal computer connected to the Internet.

Figure 3:
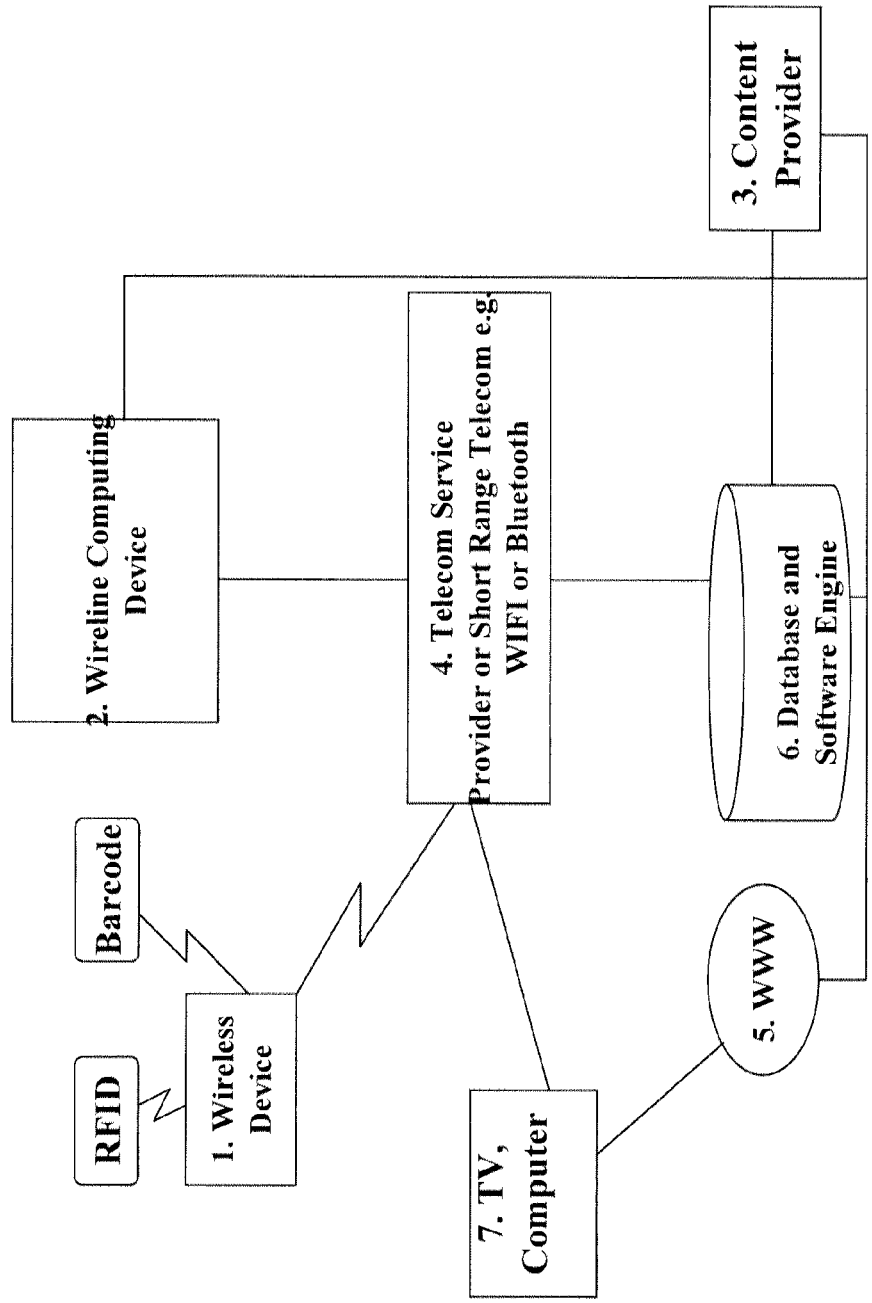
FIG. 3: depicts a platform and network for the generation of requests for and delivery of digital samples of digital product, or information about products, according to user-specified criteria or the reading of a product identifying code with a wireless device.

FIG. 3: Provision of Digital Product Samples According to Subscriber Criteria and to a Wireless Device Upon Reading of a Product Code; comprises: a wireless device or landline device capable of Internet access such as a computer or television (1, 2, 7); a content provider (3); a telecommunication service provider (4); the Internet or World Wide Web (5); and a database server and software engine (6). A subscriber my register to receive samples of new digital content such as music, video, games, books or product information according to specified criteria from a content provider through the Internet or a wireless service provider serving content from the content provider. The wireless service and content provider may be a retail establishment broadcasting short-range RF such as WiFi. Alternatively, a user of a wireless device (1) equipped with capability to read a product code such as a RFID (radio frequency identification) or barcode using RF technology, optical scanning or digital camera technology, is enabled to select a service providing said user with sample digital content associated with said read product code. A registered user who has specified the addresses to which he wishes that samples be sent, such as device (1) receives regular digital samples of digital product such as music, film, game or book new releases according to user-selected criteria filters. The user may then select to purchase via download, order physical shipment, indicate desirability of the sample, recommend and forward the sample to other contacts and potentially receive value in exchange for the forwarded recommendation or the future purchase activity of recommendees. Content is provided by a content provider such as a music distribution company (3) and stored and updated in one or more databases accessible by a telecommunications service provider (4). A software engine (6) triggers distribution of said samples according to stored registrant criteria and designated addresses. Forwarded samples may be cross-referenced against a master database of registrants and incentives provided to the forwarder according to the status of the forwardee in said database.

Figure 4:
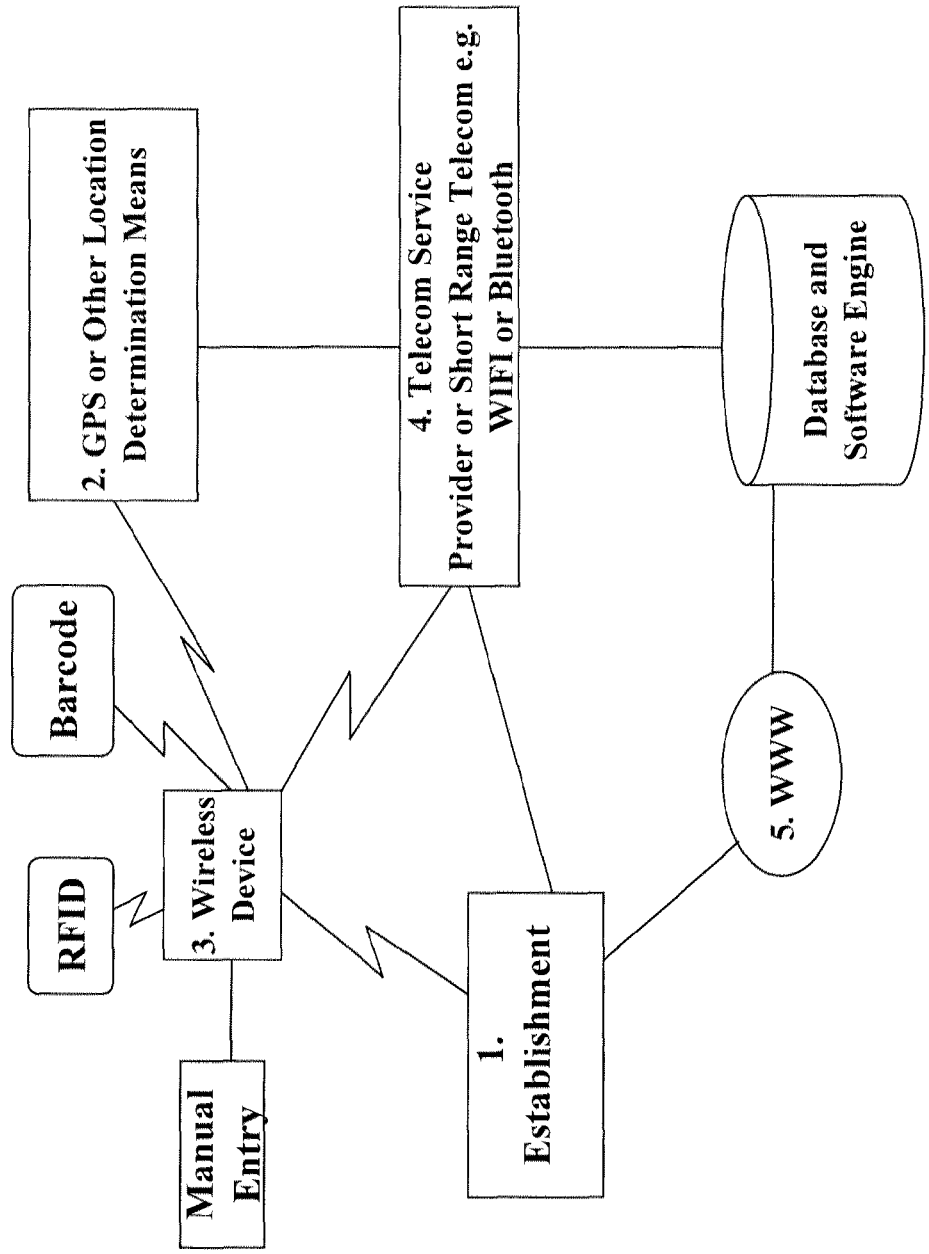
FIG. 4: depicts the platform and network for the generation of requests for and delivery of data concerning the location, availability and price of products according to a user request generated through a wireless device equipped with geographic positioning technology and the reading or entry of a product identifying code by a user into or with a wireless device.

FIG. 4: Wireless Location-Based Product Price, Availability and Information Service is a variation of the service of FIG. 3 and comprises: one or more establishments (1) with content pertaining to products carried in their inventory, prices, inventory status, and geo-coding of the establishment address stored in one or more databases accessible through the Internet or a wireless service provider (4); (2) a global positioning means capable of determining the geographic position of a wireless device (3) that is enabled to read a product code such as an RFID or barcode and further enabled to select a service provided by a telecommunication service provider that references a read product code and a specified distance from said wireless device or specific location against an updateable database of establishment locations, inventory and price information associated with said read product code and provides said information to the wireless device. This service may be further provided in whole or in part through the Internet (5). A wireless device user informs a network service provider that he wishes to use product information and location services through a hardware or software function of the wireless device. The user then proceeds to read a product identifying code or to manually enter that code with or into the wireless device. The user further instructs the service provider of the type of query desired; such as a product price and availability query within a given radial or driving distance of the device he is carrying. The service provider queries accessible databases including through the Internet to determine product information, inventory and price availability according to geocoded information made available by or for retail establishments as compared to the user's current location and geocoded maps of radial and driving distances. Results are relayed to the device the user is using. The relayed information may include the names, contact addresses, locations, driving directions, product availability and price of establishments with inventory matching the users' query.

In one embodiment, the present invention provides to wireless devices equipped with global positioning technology, product-specific price, availability and descriptive or related information upon a reading of a product identifying code such as a bar or RFID (radio frequency identification) code with such a device or manual entry of said code into such device by cross-referencing said product code to an updateable database of geocoded merchant locations, inventory status and prices. Thus, the service provider may obtain, from the wireless device, inter alia, descriptive information specific to the product since the descriptive information is product specific.

Figure 5:
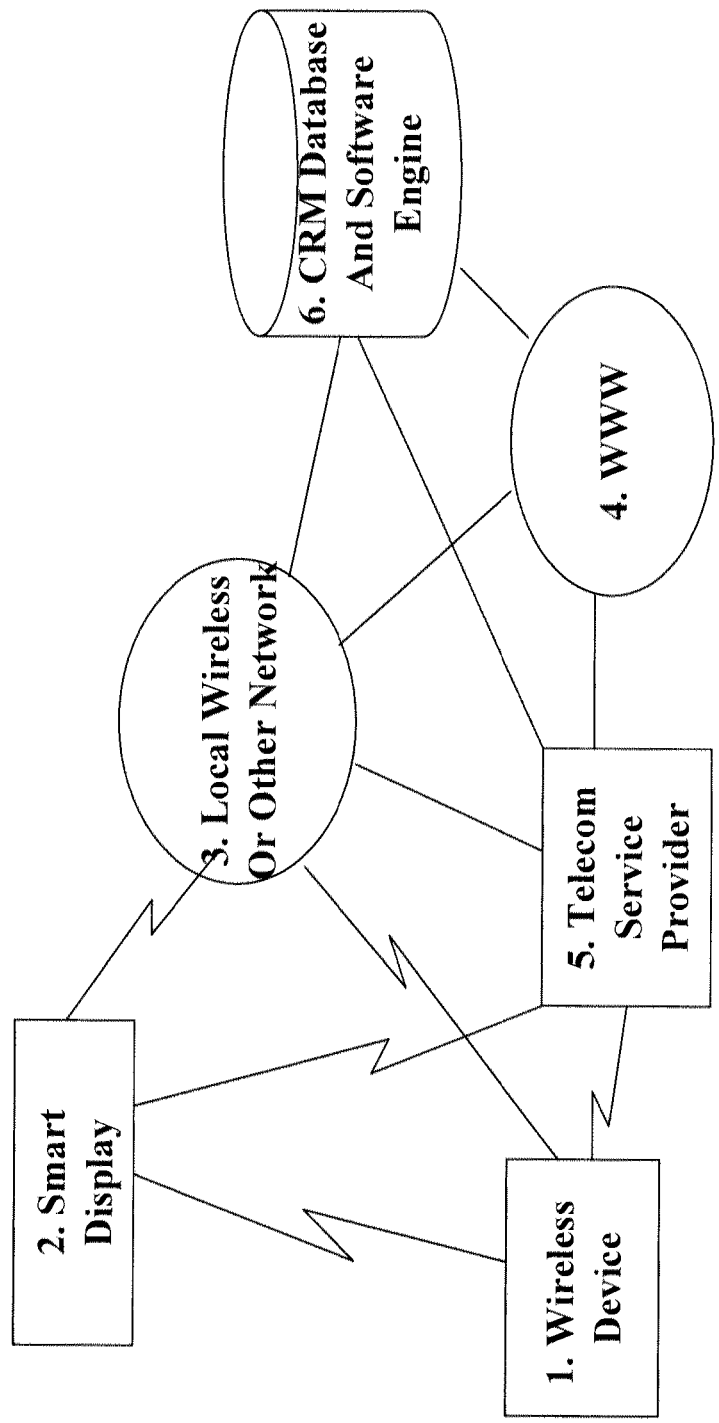
FIG. 5: depicts the platform and network for short-range digital interaction among wireless devices and smart customer-service or information provision systems.

FIG. 5: Short-Range Wireless Device-Related CRM Service; comprising: a wireless device(s) (1); a smart display or transmitter (2) controlled by a local smart wireless network server (3) with access to a customer relationship database and software engine; the Internet (4); and a telecommunication service provider (5). Within a given proximity to a local wireless server network (3), a wireless device (1) is detected and the ID of said device is obtained, or information relayed by the device about the identity of its owner or user is obtained and cross-referenced to an internal customer database (3) or is researched through the Internet (4) or a database of the telecommunications service provider (5). Identifying information is further referenced against transaction history associated with said device or with an known owner of said device or with demographics provided by a telecommunications service provider (5) about the owner of said device. Based upon criteria programmed into a CRM (customer relationship management) server, content is displayed on a proximal smart display or transmitted to the proximal wireless device. For example, a customer identified through the identity of the wireless device he is carrying or information supplied by the smart device to a local wireless smart server, may see on a proximal smart display driven by the local server, or have transmitted to his wireless device, a promotion targeted to him based on his demographics and/or transaction history with the retail establishment that he has entered.

Figure 6:
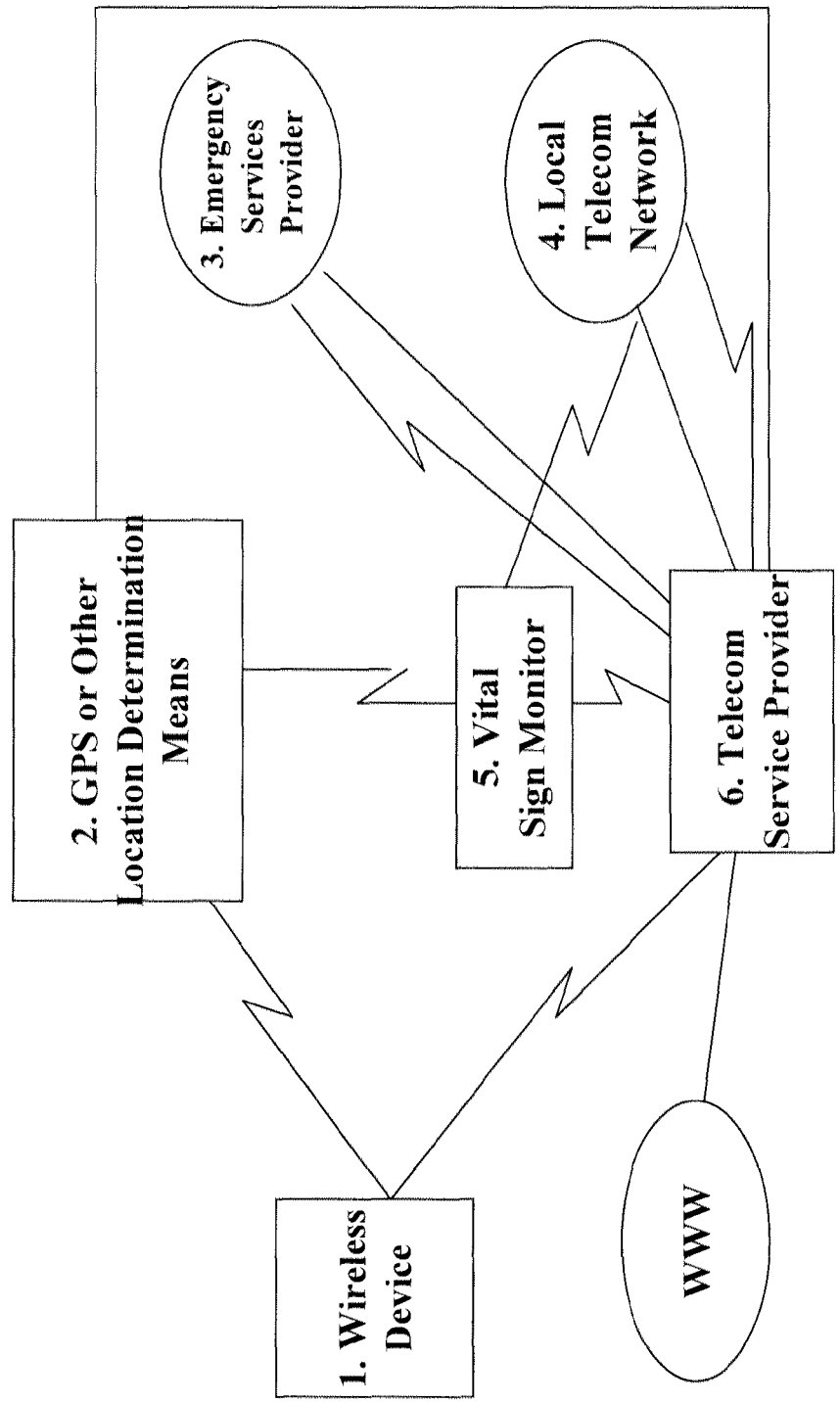
FIG. 6: depicts the platform and network for the wireless provision of information about vital signs and location of living beings or property as messages provided to predetermined telephone or Internet addresses.

FIG. 6: Wireless Vital Sign Monitoring; comprising one or more wireless devices (1); a geographic position determination system such as GPS (2); an emergency service provider such as police or medical (3); a local wireless network (4) connected with a regional, national or global telecommunications service provider (6); and a wireless vital sign monitor (5) that is attached to, implanted in, or remotely monitors vital signs and location of a living being. A vital sign monitor monitors vital signs and/or location of a subject in real time or over sample time periods. If pre-determined parameters are violated, the monitor wirelessly instructs a local telecommunications node such as a digital telephone or computer connected to the Internet and equipped with WiFi or Bluetooth or related technology and enabled to detect and act upon said wireless monitor instruction; to contact pre-determined addresses. These addresses may be wireless, or landline, private or belonging to emergency service providers such as police or medical services. Thus if an infant wearing such a monitor and in the care of a babysitter registers an exceptional temperature (hot or cold), the monitor contacts a local telecommunications device such as a digital telephone or computer connected to the Internet and enabled with local wireless network capability via the likes of WiFi or Bluetooth. The combination of the exceptional vital sign or location reading of the subject, and programming of the digital telephone instruct the telephone to message such as SMS (short message system), in a specifiable sequence to a series of telephone numbers or Internet addresses.

As will be recognized by those skilled in the art, the innovative concepts described in the present invention can be modified and varied over a wide range of applications. Accordingly, the scope of patented subject matter should not be limited to any of the specific exemplary teachings discussed, but is instead defined by the inherent claims.

I claim:

1. A method comprising:
  receiving, by one or more servers, from a wireless device, a product identifying code that identifies a product, wherein information pertaining to the product is stored in a data storage;
  receiving, by the one or more servers, an indication of a location of the wireless device;
  comparing, by the one or more servers, the received product identifying code with a plurality of stored codes stored in the data storage to determine a matching code from the stored codes, wherein the stored codes are referenced to respective items of data in the data storage, wherein the respective items of data comprise respective information pertaining to respective products;
  determining, by the one or more servers, the information pertaining to the product by retrieving one of the items of data from the data storage based at least in part on the matching code being referenced in the data storage to the retrieved one of the items of data; and
  transmitting, by the one or more servers, to the wireless device, information pertaining to the product, wherein the information pertaining to the product comprises a name of at least one establishment from which the product is available, and informational content including at least one of:
    a contact address for the at least one establishment,
    driving instructions to the at least one establishment,
    a price of the product at the at least one establishment,
    a geocoded location of the at least one establishment relative to the indicated location of the wireless device, or
    descriptive information specific to the product.

2. The method of claim 1, wherein the informational content comprises the descriptive information specific to the product.

3. The method of claim 1, wherein the informational content comprises the geocoded location.

4. The method of claim 3, further comprising indicating a distance from the at least one establishment to the wireless device based at least in part on the geocoded location.

5. The method of claim 1, wherein the transmitting the information pertaining to the product comprises transmitting information that is specific to a geographic region in which the wireless device is indicated to be located.

6. The method of claim 1, wherein the transmitting the information pertaining to the product does not comprise transmitting the price of the product at the at least one establishment.

7. The method of claim 1, the method further comprising sending, to the wireless device, a sample of digital content corresponding to the product.

8. A method comprising:
  receiving, by one or more computing devices, from a wireless device, a product identifying code that identifies a product;
  determining demographic information of a user associated with the wireless device;
  receiving an indication of a geographic position of the wireless device;
  determining transaction history information of the user associated with the wireless device;
  determining information pertaining to the product to send to the wireless device based at least in part on the transaction history information of the user; and
  transmitting, to the wireless device, based at least in part on the demographic information of the user, the information pertaining to the product, wherein the information pertaining to the product is specific to a geographic region relating to the indicated geographic position of the wireless device, and the information pertaining to the product comprises at least one of:
    a name of at least one establishment in the geographic region,
    a contact address for the at least one establishment,
    driving instructions to the at least one establishment,
    an availability of the product at the at least one establishment,
    a price for purchasing the product at the at least one establishment, or
    descriptive information specific to the product.

9. The method of claim 8, further comprising sending, to the wireless device, a sample of digital content corresponding to the product.

10. The method of claim 8, further comprising indicating a distance from the geographic position of the wireless device to the at least one establishment.

11. The method of claim 8, further comprising:
  comparing the received product identifying code with a plurality of stored codes stored in a data storage to determine a matching code from the stored codes, wherein the stored codes are referenced to respective items of data in the data storage, wherein the respective items of data comprise respective information pertaining to respective products; and
  determining the information pertaining to the product by retrieving one of the items of data from the data storage based at least in part on the matching code being referenced in the data storage to the retrieved one of the items of data.

12. The method of claim 8, further comprising:
  receiving an indication that a location of the wireless device is at a first establishment; and
  determining, based at least in part on the location of the wireless device, a second establishment from which the product is available, wherein the at least one establishment comprises the second establishment.

13. A system comprising:
  at least one computing device configured to implement one or more services, wherein the one or more services are configured to:
    receive, from a wireless device, a product identifying code that identifies a product;
    receive an indication that a location of the wireless device is at a first establishment;

determine, based at least in part on the location of the wireless device, a second establishment from which the product is available;

determine transaction history information of the user associated with the wireless device;

determine information pertaining to the product to send to the wireless device based at least in part on the transaction history information of the user; and send, to the wireless device, the information pertaining to the product, wherein the information pertaining to the product comprises at least one of:
- a name of the second establishment from which the product is available,
- location information for the second establishment, or
- a price of the product at the second establishment.

14. The system of claim 13, wherein the one or more services are further configured to:
- determine demographic information of a user associated with the wireless device; and
- determine the information pertaining to the product to send to the wireless device based at least in part on the demographic information of the user.

15. The system of claim 13, wherein the location information for the second establishment includes at least one of:
- a contact address for the second establishment,
- driving instructions to the second establishment, or
- a geocoded location of the second establishment relative to the indicated location of the wireless device.

16. The system of claim 15, wherein the one or more services are further configured to provide an indication of a distance from the second establishment to the wireless device based at least in part on the geocoded location.

17. The system of claim 13, wherein the one or more services are configured to send the information pertaining to the product based at least in part on determining that the second establishment is at least one of:
- within a user-defined distance from the location of the wireless device; or
- within a user-specified geographic region.

18. The system of claim 13, wherein the one or more services are further configured to send, to the wireless device, a sample of digital content corresponding to the product.

19. The system of claim 13, wherein the one or more services are further configured to:
- compare the received product identifying code with a plurality of stored codes stored in a data storage to determine a matching code from the stored codes, wherein the stored codes are referenced to respective items of data in the data storage, wherein the respective items of data comprise respective information pertaining to respective products; and
- determine the information pertaining to the product by retrieving one of the items of data from the data storage based at least in part on the matching code being referenced in the data storage to the retrieved one of the items of data.

* * * * *